3,299,552
AUTOMOTIVE MESSAGE INDICATOR
AND ACTUATOR
Herman Newman, Bronx, N.Y. (97—30 57th Ave., Rego Park, N.Y. 11368), and David Coby, New York, N.Y. (19984 Hartwell Ave., Detroit, Mich. 48235)
Filed June 23, 1964, Ser. No. 377,366
2 Claims. (Cl. 40—52)

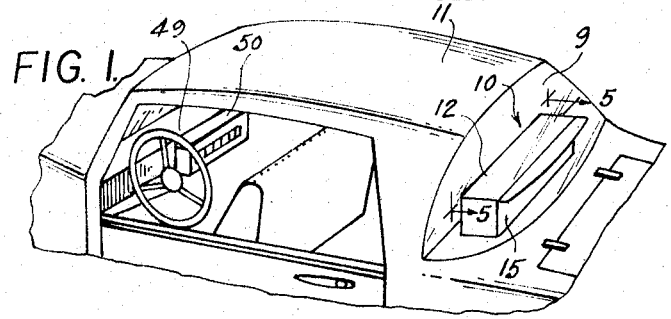
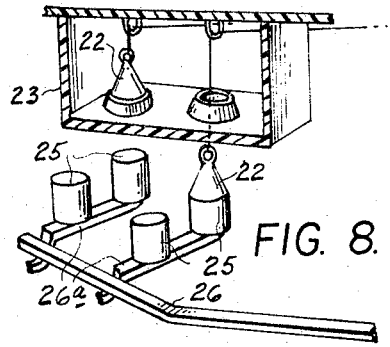
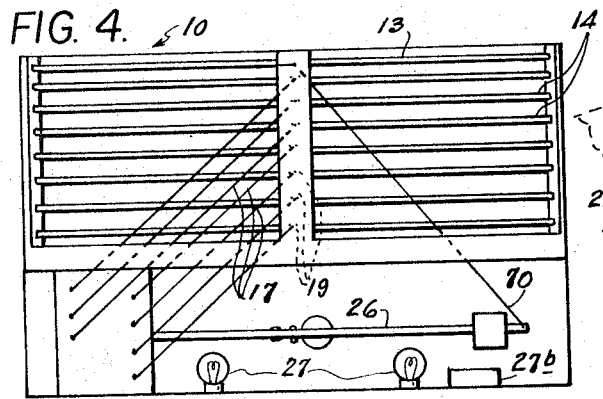
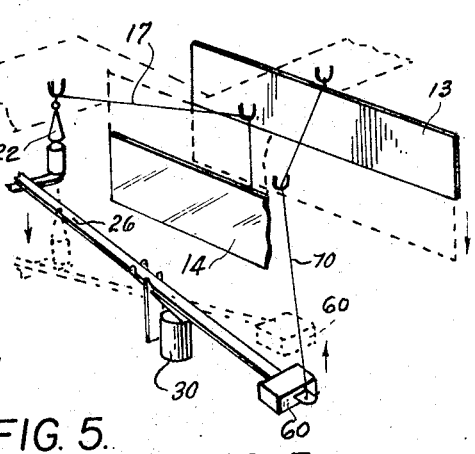
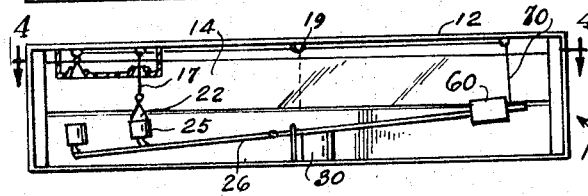
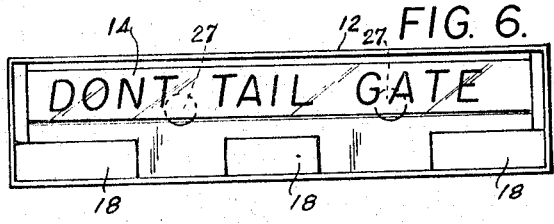
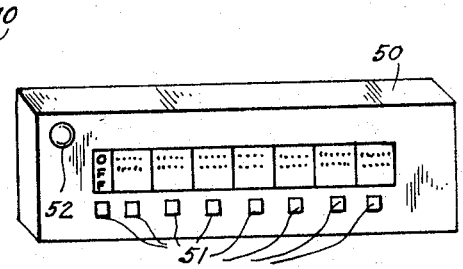
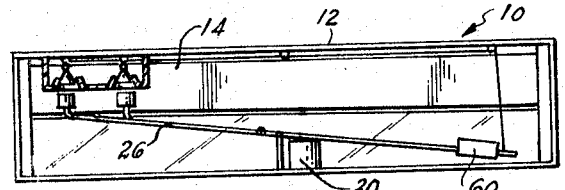
INVENTORS
HERMAN NEWMAN
DAVID COBY
ATTORNEYS

United States Patent Office 3,299,552
Patented Jan. 24, 1967

This is a continuation-in-part of our co-pending application, Serial No. 223,766, filed September 14, 1962, and now abandoned, for an Automotive Indicator.

This invention is concerned with a method and means for mechanical actuation; more specifically it presents a mechanical device for use in conjunction with equipment such as display signs; and in detail, it is concerned with means whereby an operator of a vehicle may indicate to others any of a series of predetermined messages.

Automotive safety and convenience are a prime importance today. While many varieties and types of such devices have been made available, there is still an area that has been left unsatisfied. It is often important for the operator of a vehicle to indicate to others certain messages. At present, a driver may signal only by utilizing hand signals, directional indicators, and brake lights. Other important conditions may not be indicated. For example, it is often desirable to indicate to another driver that he is tail-gating or driving too close. At other times, it may be important to indicate to a driver some emergency condition which might not be otherwise apparent. Additionally, messages may be important while parked, such as "Doctor On Call." It will be realized that the varieties of types of information to be transmitted are almost endless.

Prior art devices to accomplish the above, even when contemplated, have been inefficient, expensive, complicated and not reliable.

It is a cardinal object of this invention, therefore, to provide an apparatus and method for the actuation of display devices and the like.

Another primary object of the device described herein is the provision of a display device that will be usable as an automotive message indicator.

Another important object and accomplishment hereof is to set forth a display device for use at the rear of vehicles.

Still another object and accomplishment of the invention described herein is to set forth a device as above-described that will be economical and relatively easy to produce, and that may be installed within the car during the manufacture thereof, or thereafter; or may be constructed as an integral portion of the car.

A further purpose of the device herein is the provision of a display message indicator at the rear of a vehicle which may be controlled and operated from the front dashboard thereof.

A still further purpose and object of this invention is the provision of a device as above-described that will display any of a plurality of messages instantaneously or almost instantaneously and without the delay normally encountered when changing from one message to another.

With these objects in view, the invention consists of the novel features of construction and arrangement of parts which will appear in the following specification and recited in the appended claims, reference being had to the accompanying drawings in which the same reference numerals indicate the same parts throughout the various fingures and in which:

FIG. 1 is a fractional prospective view of a passenger automobile with the instant invention installed therein.

FIG. 2 is a perspective view of the dashboard control box for the instant device.

FIG. 3 is a view in perspective, diagrammatically illustrating the workings of the card indicator.

FIG. 4 is a fractional top plan view of the rear indicator taken substantially along line 4—4 of FIG. 5 with portions removed.

FIG. 5 is a sectional elevational view of the rear indicator taken substantially along line 5—5 of FIG. 1.

FIG. 6 is a front elevational view on an enlarged scale of one of the card actuators in the housing.

FIG. 7 is a sectional elevational view of the rear of the actuator assembly.

FIG. 8 is a perspective diagrammatic representation of the coil portion operation of the display indicator.

These is shown herein an exemplary embodiment of the invention as an automotive message display indicator. It will be understood that the method of actuation herein may be utilized for many and varied purposes.

Referring to the drawings, there is illustrated what may be for some purposes a preferred embodiment of the invention, and there is illustrated generally a message indicator 10 positioned at the rear of the vehicle 11. The indicator 10 illustrated herein is positioned interior of the rear window 9 of the vehicle 11. It could, however, as well be positioned in any other convenient and available portion at the rear of the vehicle, such as, but not limited to, the rear bumper, the trunk, the license plate frame, etc.

The rear message display indicator 10 will be comprised essentially of a housing 12, a plurality of indicator cards 14 and a separate actuator means for each of the said indicator cards 14. Said display cards 14 may be translucent.

Each of the cards 14 will have thereon an individual predetermined message possibly in reflective material such as "Don't Tail-Gate," "Dim Lights," etc., together with any other convenient messages. Additional blank cards may be provided for special messages. The housing 12 will have at least one window portion 15 therein open in a direction facing rearward. When any of the message cards 14, which will normally be located in the housing 12 project in alignment with the window portion 15, it will be visible through the said window.

In the embodiment of the invention illustrated, the invention is disclosed as displaying any one of seven display cards 14, or the one blank card 13.

Each of the message cards 14 will be connected to a flexible member such as a cord 17 and slidably secured in position by side and center supports 18 which may be provided to assist in supporting the message cards 14 and to guide the said cards in their movement. The forward end of each of the cords 17 will be movably supported and guided by the eyelets 19 but may be raised together with its attached message card 14. This invention is concerned primarily with the apparatus for raising any one of the cords 17 as desired, together with its message card 14 thereby displaying the same.

The ends of each of the cords 17 opposite the indicator cards 14 will each be affixed to a magnetically attractive member 22. Each of the magnetically attractive members 22 is affixed immediately above a coil 25. To secure the magnetically attractive members 22 in position, a guide bracket 23 may be provided as will be seen in detail in FIG. 8. Each of the coils 25 will be affixed to arms 26a secured to a lever 26. The lever 26 will be adapted for pivoting movement as will be explained in detail hereinafter. Should any of the coils 25 be supplied with electrical energy, it will convert the said coil 25 to a magnet thereby attracting the member 22. Thus, any of the coils 25 supplied with energy will clamp one of the members 22 as will be seen in detail in FIG. 8, thereby pulling the said member 22 when the said lever 26 pivots. Each of the coils 25 will normally be inactive, however, and will be supplied with energy by a direct connection to the appropriate switch only when a desired indicator card is to be elevated. Each of the coils 25 will therefore correspond to one indicator card; to wit, the card affixed to the cord attached to the member 22 immediately above the said coil 25. As will be seen from the drawings, when any of the members 22 are in the elevated position, the indicator cards 14 will be in their lowered position whereby they will not be visible through the rear of the display indicator. Should any of the coils 25 be actuated, however, and the lever 26 depressed, the appropriate coil 25 will cause one of the members 22 to descend with the said coil 25 thereby urging the desired indicator card 14 through the appropriate cord 17, to elevate. Electrical solenoid means 30 is provided at a central portion of the lever 26 to cause the said lever 26 to move from its normal position as shown in FIG. 7, to its activated position as shown in FIG. 5. A supply of electrical energy will cause the solenoid 30 to move the lever 26 from the FIG. 7 position to the FIG. 5 position. Any of the coils 25 actuated at the same instant, will cause the appropriate coil 25 and thereby the member 22, the cord 17 and the appropriate indicator card 14 will be displayed at the rear of the vehicle. When in the raised position the message card will be displayed.

Thus, it will be seen that one solenoid and lever 26 is utilized to raise any one of a plurality of message cards 14 or the like. The same apparatus is useful whenever it is desired to move any one of a plurality of items such as display cards.

Each display card 14 will have its own cord 17 and coil 25 thereby providing separate operation for each of the cards 14, by the one solenoid 30 and lever 26.

Of course, suitable lamps 27 may be provided in and about the portion of the housing 12 for improved visibility of any of the message cards 14, connected to an electrical flasher 27B for intermittent flashing of the lamps 27.

Each of the electrical coils 25 will be controlled from a central panel box 50 positioned on the front dashboard 49 of the vehicle 11. For example, in FIG. 2 there is disclosed a panel box 50 having a plurality of electrical switches 51. Each of the switches 51 will complete an electrical circuit to one of the coils 25, receiving power from the vehicle battery or from a separate source, if desired. A main control switch may be supplied, if desired, or the vehicle current may be connected directly to the switches 51.

Thus, for example, one of the switches 51 may be connected to the electrical coil 25 illustrated in FIGS. 5 and 6, as in a position elevating the appropriate message card 14 marked "Don't Tail-Gate." Should it be desired to indicate this message at the rear of the vehicle, the switch 51 will be actuated. Any of the message cards 14 may be extended in a similar manner merely by extending the appropriate one of the switches 51.

Each of the switches 51 will be of a double pole type, supplying electrical current to the electrical solenoid 30 in addition to the appropriate coil 25. Thus, each switch 51 will connect to the solenoid 30 and will pivot the lever 26. Additionally, it will actuate one predetermined coil 25 causing that coil 25 only, its member 22 and card 14 to rise to the display position.

A suitable source of light may be located within the panel box 50 to light up the translucent surface on which the messages are inscribed so that they may easily be visble for night driving. Of course, if desired, additional individual light sources may be provided connected through each of the appropriate switches to make apparent at a glance, which, if any, of the messages are indicated at any time.

Still further, a red flasher light 52 connected to the rear flasher 27b, indicates the flashing operation.

Additionally, the opposite end of the lever 26, may have a weight or the like 60 to insure that the lever 26 will return to the position as indicated in FIG. 7 when the current is removed from the solenoid 30. An additional cord 70 will connect the weight end of the lever 26 to a forward card 13 in the unit. The forward card 13 will be blank and will be displayed when no message is to be indicated from the unit.

It will be apparent that when the left-hand portion of the lever as shown in FIG. 7 is in the elevated position, whereby all of the indicator cards 14 will be depressed, the opposite end of the lever 26 will be depressed whereby the single card 13 always attached to that end of the lever 26 will be elevated through the interconnection of the cord 70. Thus, the said neutral or non-message card 13 will be elevated blocking the front of the indicator. In the normal position, therefore, the blank card 13 will be elevated thereby indicating no message. When current is supplied to the solenoid 30 thereby rotating the lever 26 to the FIG. 5 position, the front card 13 will be depressed in that the weight side of the lever 26 will elevate, thereby allowing the display of any of the desired cards through the expedient of the desired coil 25, the member 22 and the appropriate cord 17.

It will be seen then that there is provided herein a device to accomplish all of the objects previously set forth and others. A new method of mechanical movement in actuation is accomplished wherein one solenoid may move any one of a plurality of desired actuating arms.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein, or required by the prior art.

Having thus described our invention and illustrated its use, what we claim as new and desire to secure by Letters Patent is:

1. An indicating device comprising, in combination:
 (a) a housing having a window portion,
 (b) a plurality of indicator cards within said housing each adapted for successive display through said window portion,
 (c) and means including one solenoid for urging any of said indicator cards to the display position,
 (d) and magnetic coil means for successively connecting any of said indicating cards to said means including one solenoid,
 (e) and an electrical switch electrically connected to each of said magnetic coils whereby any of said magnetic coils may be actuated as desired,
 (f) and flexible cord means between each of said coils and each of said indicator cards respectively whereby movement of any of said coils will result in corresponding movement of one of said indicator cards,
 (g) and at least one blank card, said blank card being positioned for display through said window portion of said housing when any of said indicator cards are not displayed,
 (h) said means including one solenoid also including a pivotable lever, said coils being connected to one end of said lever and said blank card being connected to said other end of said lever, said solenoid being adapted to pivot said lever from a first position to a second position.

2. An indicating device comprising, in combination:
 (a) a housing having a window portion,
 (b) a plurality of indicator cards within said housing each adapted for successive display through said window portion,
 (c) and means including one solenoid for urging any of said indicator cards to the display position,
 (d) and magnetic coil means for successively connecting any of said indicating cards to said means including one solenoid,
 (e) and an electrical switch electrically connected to each of said magnetic coils whereby any of said magnetic coils may be actuated as desired, (f) and flexible cord means between each of said coils and each of said indicator cards respectively whereby movement of any of said coils will result in corresponding movement of one of said indicator cards, (g) and at least one blank card, said blank card being positioned for display through said window portion of said housing when any of said indicator cards are not displayed, (h) said means including one solenoid also including a pivotable lever, said coils being connected to one end of said lever and said blank card being connected to said other end of said lever, said solenoid being adapted to pivot said lever from a first position to a second position, (i) at least one of said indicator cards being displayed and said blank card being not displayed when said lever is in said first position and said indicator cards being not displayed and said blank cards being displayed when said lever is in said second position.

References Cited by the Examiner

UNITED STATES PATENTS

| | | | |
|---|---|---|---|
| 1,240,380 | 9/1917 | Singer | 340—124 |
| 1,409,898 | 3/1922 | Olson | 340—124 |
| 1,891,581 | 12/1932 | Sherwood et al. | 40—52 |

EUGENE R. CAPOZIO, *Primary Examiner.*

W. H. GRIEB, *Assistant Examiner.*